(12) United States Patent
Hussey et al.

(10) Patent No.: US 7,709,992 B2
(45) Date of Patent: May 4, 2010

(54) ELECTRIC MACHINE

(75) Inventors: John H. Hussey, St. Louis, MO (US);
Alan D. Crapo, Florissant, MO (US);
Thomas M. Bourquin, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 145 days.

(21) Appl. No.: 12/183,769

(22) Filed: Jul. 31, 2008

(65) Prior Publication Data

US 2010/0026135 A1 Feb. 4, 2010

(51) Int. Cl.
*H02K 1/06* (2006.01)

(52) U.S. Cl. .................. 310/216.111; 310/216.055; 310/216.071

(58) Field of Classification Search ............ 310/216.55, 310/216.111, 216.71–216.74, 254.1
See application file for complete search history.

(56) References Cited

U.S. PATENT DOCUMENTS

| | | | |
|---|---|---|---|
| 3,324,371 A | 6/1967 | Stauffer | |
| 3,348,183 A | 10/1967 | Hodges et al. | |
| 3,450,338 A | 6/1969 | Huttenlocher | |
| 3,488,569 A | 1/1970 | Allendorph et al. | |
| 3,515,919 A | 6/1970 | Houtman | |
| 3,528,171 A | 9/1970 | Houtman | |
| 3,942,055 A * | 3/1976 | Hoffmeyer | 310/216.111 |
| 4,035,910 A | 7/1977 | Kindig | |
| 4,100,444 A | 7/1978 | Boyd, Jr. | |
| 4,107,583 A | 8/1978 | Houtman | |
| 4,241,274 A * | 12/1980 | Brammerlo | 310/216.071 |
| 4,780,635 A * | 10/1988 | Neumann | 310/216.111 |
| 4,801,832 A * | 1/1989 | Neumann | 310/216.111 |
| 4,831,301 A * | 5/1989 | Neumann | 310/216.111 |
| 4,880,391 A | 11/1989 | Hurtgen | |
| 5,283,486 A * | 2/1994 | Kobori | 310/216.111 |
| 5,799,387 A * | 9/1998 | Neuenschwander et al. | 29/598 |
| 5,811,907 A * | 9/1998 | Fukuda et al. | 310/216.073 |
| 6,020,667 A * | 2/2000 | Carey et al. | 310/216.049 |
| 6,114,790 A | 9/2000 | Fei | |
| 6,257,840 B1 | 7/2001 | Ignatiev et al. | |
| 6,349,558 B1 | 2/2002 | Ichikawa et al. | |
| 6,544,009 B2 | 4/2003 | Makino et al. | |
| 6,634,182 B2 | 10/2003 | Ichikawa et al. | |

(Continued)

FOREIGN PATENT DOCUMENTS

CN 2031175 UU 1/1989

(Continued)

*Primary Examiner*—Thanh Lam
(74) *Attorney, Agent, or Firm*—Senniger Powers LLP (57) ABSTRACT

A stator assembly adapted for use in an electric motor. The assembly includes a stator core having an annular rim and a plurality of teeth extending radially inward from the rim. The stator core has an outer diameter, a root tooth diameter and an inner diameter. Each tooth has a root, a neck extending inward from the root, a head opposite the root, and a length measured from its root to its head. The neck has a width. Each adjacent pair of teeth define a slot having an area. The assembly also includes a winding having aluminum and/or copper wrapped around at least three teeth of the stator core. The stator core and winding have four, six or eight magnetic dipoles. The stator core outer diameter is in a range from about 5.1 inches to about 5.9 inches. The stator core inner diameter is less than about 3.0 inches.

53 Claims, 4 Drawing Sheets

U.S. PATENT DOCUMENTS

| | | |
|---|---|---|
| 6,708,520 B2 | 3/2004 | Yasunori et al. |
| 7,082,786 B2 | 8/2006 | Yasunori et al. |
| 2004/0056557 A1 | 3/2004 | Enomoto et al. |
| 2005/0103074 A1 | 5/2005 | Kim et al. |
| 2006/0163966 A1 | 7/2006 | Yang et al. |
| 2007/0007843 A1 | 1/2007 | Matsubara |
| 2008/0012438 A1 | 1/2008 | Hong |
| 2008/0129131 A1 | 6/2008 | Shin et al. |

FOREIGN PATENT DOCUMENTS

| | | |
|---|---|---|
| CN | 1476151 A1 | 2/2004 |
| CN | 2650377 YY | 10/2004 |
| EP | 1863148 A2 | 12/2007 |
| JP | 58189354 A1 | 11/1983 |
| JP | 200083339 A1 | 10/2000 |
| WO | 2008032942 A1 | 3/2008 |
| WO | 2008055408 A1 | 5/2008 |

* cited by examiner

ELECTRIC MACHINE

BACKGROUND

The present invention relates to electric machines, such as motors or generators, and more particularly to electric machines having aluminum windings.

Electric machines, such as motors or generators, typically include a stator mounted inside a housing and a rotor supported in the housing for rotation relative to the stator. The stator and/or the rotor of the machines have windings comprising coils of wire. In motors, electricity is delivered through these coils to generate magnetic fields, causing the rotor to turn. In generators, the electricity is generated in the windings as the rotor turns. Although different electrically conductive materials may be used to make the windings, in the past these windings have frequently been made from copper or copper alloys. Electric machines are often integrated into apparatus such as air handling equipment, washing machines, stationary bicycles and treadmills. The size, performance and cost of the apparatus incorporating the electric machine may be important factors when making purchasing decisions. The size, performance and cost of the electric machine frequently have a significant impact on the overall size and cost of the apparatus.

Prices of conductive materials used to make windings fluctuate. At times, some winding materials are more expensive than others. For example, sometimes copper is very expensive relative to other electrically conductive materials such as aluminum. Electrical conductivity of the material is also a significant consideration. As conductivity decreases, larger windings must be used to overcome losses. However, larger windings raise concerns about machine size and resulting apparatus size. Thus, even though some materials such as aluminum can have a cost advantage over more frequently used materials such as copper, copper may still be used due to these other concerns such as size. Conventionally, modifying a motor designed for copper windings to accept aluminum windings at similar performance required a motor having a greater volume. This volume increase was often accomplished by substantially increasing the diameter and/or the length of the motor to accommodate increased aluminum winding volume over the conventional copper winding volume. But if the exterior size of the motor is restricted by the application in which the motor is to be used, these increases in length and/or diameter cannot be accomplished and the alternative winding material (e.g., aluminum) cannot be used without sacrificing performance. It would be advantageous if the electric machine could incorporate more cost effective materials (e.g., aluminum windings) while maintaining similar performance in a motor without substantially increasing its diameter and/or length.

BRIEF SUMMARY

In some embodiments, the present invention relates to a stator assembly adapted for use in an electric motor. The assembly comprises a stator core having an annular rim and a plurality of teeth extending radially inward from the rim. The core has an outer diameter, a root tooth diameter and an inner diameter. Each tooth of the plurality of teeth has a root, a neck extending inward from the root, a head opposite the root, and a length measured from its root to its head. The neck has a width. Each adjacent pair of teeth of the plurality of teeth defines a slot having an area. Further, the assembly includes a winding comprising at least one of aluminum and copper wrapped around at least three teeth of the plurality of teeth of the stator core. The stator core and winding have four, six or eight magnetic dipoles. The stator core outer diameter is in a range from about 5.1 inches to about 5.9 inches. The stator core inner diameter is less than about 3.0 inches. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to a stator assembly adapted for use in an electric motor. The assembly comprises a stator core having an annular rim and a plurality of teeth extending radially inward from the rim. The core has an outer diameter, a root tooth diameter and an inner diameter. Each tooth of the plurality of teeth has a root, a neck extending inward from the root, and a head opposite the root. Each adjacent pair of teeth of the plurality of teeth defines a slot. The assembly also includes a winding comprising at least one of aluminum and copper wrapped around at least three teeth of the plurality of teeth of the stator core. The stator core and winding have four, six or eight magnetic dipoles. The stator core outer diameter is in a range from about 5.3 inches to about 5.7 inches. A ratio of the stator core inner diameter to the stator core outer diameter is less than about 0.55. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to a stator assembly adapted for use in an electric motor. The assembly comprises a stator core having an annular rim and a plurality of teeth extending radially inward from the rim. The core has an outer diameter, a root tooth diameter and an inner diameter. Each tooth of the plurality of teeth has a root, a neck extending inward from the root, a head opposite the root, and a length measured from its root to its head. The neck has a width. Each adjacent pair of teeth of the plurality of teeth defines a slot. In addition, the assembly includes a winding comprising at least one of aluminum and copper wrapped around at least three teeth of the plurality of teeth of the stator core. The stator core and winding have four, six or eight magnetic dipoles. The stator core outer diameter is in a range from about 5.1 inches to about 5.9 inches. A ratio of the tooth width to the tooth length is less than about 0.14. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to a stator assembly adapted for use in an electric motor. The assembly comprises a stator core having an annular rim and a plurality of teeth extending radially inward from the rim. The core has an outer diameter, a root tooth diameter and an inner diameter. Each tooth of the plurality of teeth has a root, a neck extending inward from the root, and a head opposite the root. The annular rim has an outer edge defining an enclosed cross-sectional area. Each adjacent pair of teeth of the plurality of teeth defines a slot having an area. Further, the assembly includes a winding comprising at least one of aluminum and copper wrapped around at least three teeth of the plurality of teeth of the stator core. The stator core and winding have four, six or eight magnetic dipoles. The stator core outer diameter is in a range from about 5.1 inches to about 5.9 inches. A ratio of a sum of the slot areas to the enclosed cross-sectional area is in a range from about 0.24 to about 0.27. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to a stator assembly adapted for use in an electric motor. The assembly comprises a stator core having an annular rim and 36 teeth extending radially inward from the rim. The core has an outer diameter, a root tooth diameter and an inner diameter. Each tooth of the 36 teeth having a root, a neck extending inward from the root, and a head opposite the root. The annular rim has an outer edge defining an enclosed cross-sectional area. Each adjacent pair of teeth of the 36 teeth defines a slot having an area. The assembly also includes a winding comprising at least one of aluminum and copper wrapped around at least three teeth of the plurality of teeth of the stator core. The stator core and winding have four, six or eight magnetic dipoles. A ratio of a sum of the slot areas to the enclosed cross-sectional area is about 0.26. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to an electric machine comprising a stator core having an annular rim and a plurality of teeth extending radially inward from the rim. The core has an outer diameter, a root tooth diameter and an inner diameter. Each tooth of the plurality of teeth has a root, a neck extending inward from the root, a head opposite the root, and a length measured from its root to its head. The neck has a width. Each adjacent pair of teeth of the plurality of teeth defines a slot having an area. Further, the electric machine includes a winding comprising at least one of aluminum and copper wrapped around at least three teeth of the plurality of teeth of the stator core. The machine also comprises a rotor body rotatably mounted inside the stator core including an external surface facing the stator core. The stator core and winding have four, six or eight magnetic dipoles. The core outer diameter is greater than about 5.1 inches. The core inner diameter is less than about 3.0 inches. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to an electric machine comprising a stator core having an annular rim and a plurality of teeth extending radially inward from the rim. The core has an outer diameter, a root tooth diameter and an inner diameter. Each tooth of the plurality of teeth has a root, a neck extending inward from the root, and a head opposite the root. Each adjacent pair of teeth of the plurality of teeth defining a slot. The electric machine also includes a winding comprising at least one of aluminum and copper wrapped around at least three teeth of the plurality of teeth of the stator core. In addition, the machine comprises a rotor body rotatably mounted inside the stator core including an external surface facing the stator core. The stator core and winding have four, six or eight magnetic dipoles. The stator core outer diameter is in a range from about 5.3 inches to about 5.7 inches. A ratio of the stator core inner diameter to the stator core outer diameter is less than about 0.55. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to an electric machine comprising a stator core having an annular rim and a plurality of teeth extending radially inward from the rim. The core has an outer diameter, a root tooth diameter and an inner diameter. Each tooth of the plurality of teeth has a root, a neck extending inward from the root, a head opposite the root, and a length measured from its root to its head. The neck has a width. Each adjacent pair of teeth of the plurality of teeth defines a slot. Further, the electric machine includes a winding comprising at least one of aluminum and copper wrapped around at least three teeth of the plurality of teeth of the stator core. The machine also comprises a rotor body rotatably mounted inside the stator core including an external surface facing the stator core. The stator core and winding have four, six or eight magnetic dipoles. The stator core outer diameter is in a range from about 5.1 inches to about 5.9 inches. A ratio of the tooth width to the tooth length is less than about 0.14. Each of the embodiments of the invention can be used in various and specific combination, and in each permutation, with one or more of these aspects of the invention. Also, one or more of these aspects of the invention can be combined with each of the other aspects and embodiments described above or below herein.

In some embodiments, the present invention relates to an electric machine comprising a stator core having an annular rim and a plurality of teeth extending radially inward from the rim. The core has an outer diameter, a root tooth diameter and an inner diameter. Each tooth of the plurality of teeth has a root, a neck extending inward from the root, and a head opposite the root. The annular rim has an outer edge defining an enclosed cross-sectional area. Each adjacent pair of teeth of the plurality of teeth defines a slot having an area. In addition, the electric machine includes a winding comprising at least one of aluminum and copper wrapped around at least three teeth of the plurality of teeth of the stator core. Further, the machine comprises a rotor body rotatably mounted inside the stator core including an external surface facing the stator core. The stator core and winding have four, six or eight magnetic dipoles. The stator core outer diameter is in a range from about 5.1 inches to about 5.9 inches. A ratio of a sum of the slot areas to the enclosed cross-sectional area is greater than about 0.26. Each of the embodiments of the invention can be used in various and specific combination, and in each permutation, with one or more of these aspects of the invention. Also, one or more of these aspects of the invention can be combined with each of the other aspects and embodiments described above or below herein.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
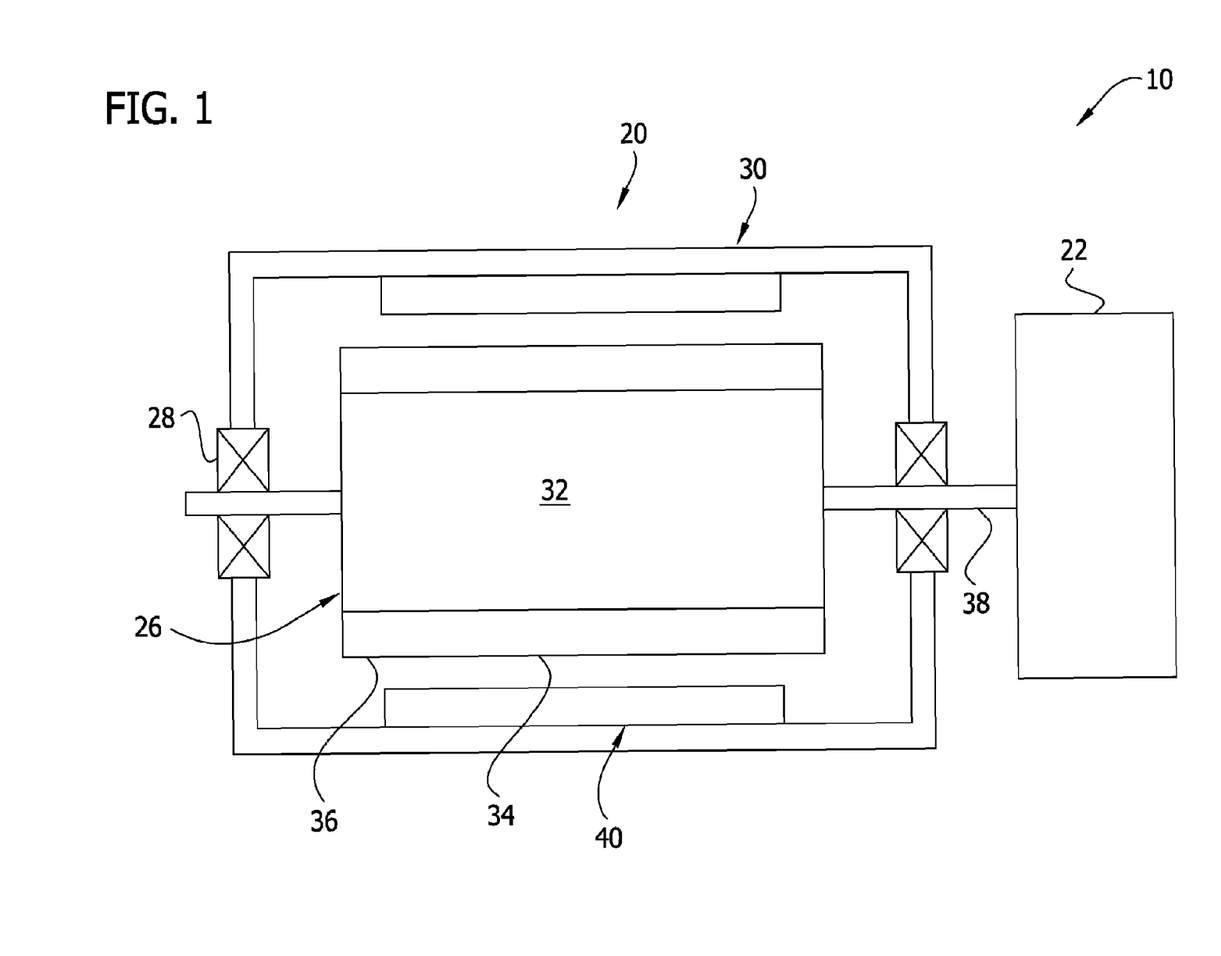
FIG. 1 is a schematic cross section of an apparatus driven by an electric machine according to one embodiment of the present invention.

Referring now to the drawings and in particular FIG. 1, an electric apparatus is designated in its entirety by the reference number 10. In one embodiment, the apparatus 10 comprises an electric motor, generally designated by 20, for driving a device 22. Although the device 22 may be of other types without departing from the scope of the present invention, in some embodiments the device comprises a blower, an impeller, a pulley, a gear, a pump and/or a fan. Further, in some embodiments, the motor 20 has a continuous duty shaft output power of less than about 1 kilowatt. In some embodiments, the motor 20 has a continuous duty shaft output power of less than about 700 watts. The electric motor 20 includes a rotor assembly, generally designated by 26, rotatably supported by bearings 28 mounted in a stator assembly, generally designated by 30. The rotor assembly 26 includes a rotor body 32 having induction rotor bars 34 angularly distributed adjacent an external surface 36 of the rotor body. The induction bars 34 may also be angularly distributed at or below the external surface of the rotor body without departing from the scope of embodiments of the present invention. The rotor assembly 26 also includes a shaft 38 about which the rotor assembly spins. The shaft 38 is mounted on the bearings 28 and couples the motor 20 to the device 22. Because the features of the rotor assembly 26 are generally well known in the art, they will not be explained in further detail.

Figure 2:
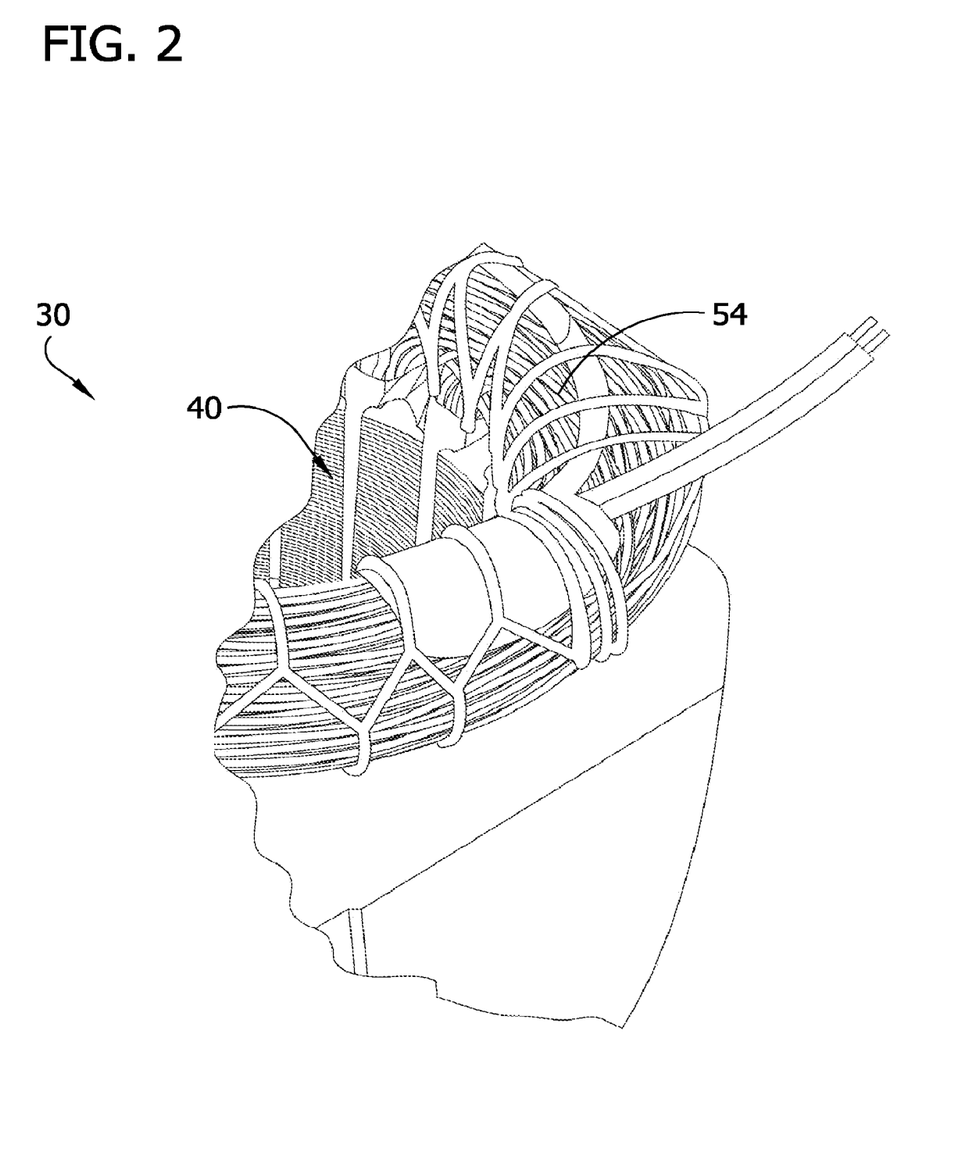
FIG. 2 is a fragmentary perspective of a stator assembly of the present invention.
Figure 3:
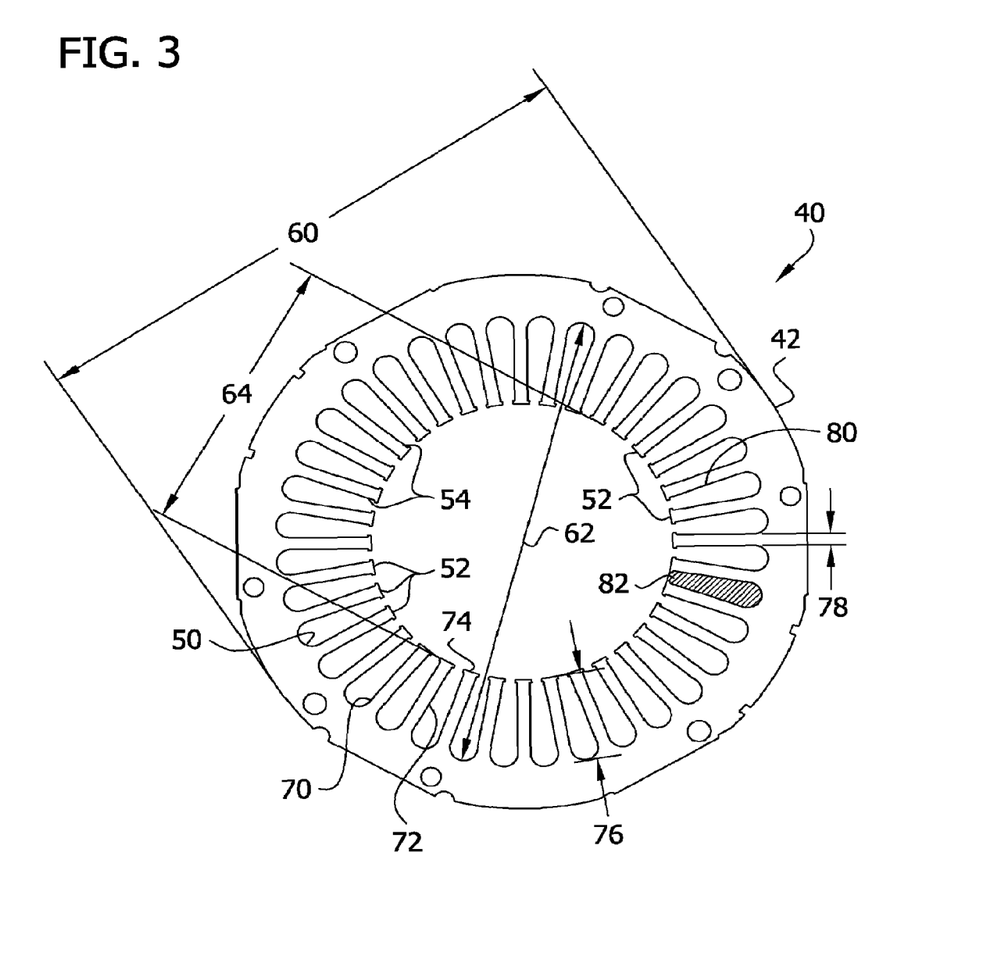
FIG. 3 is an end elevation of a stator lamination according to the present invention.
Figure 4:
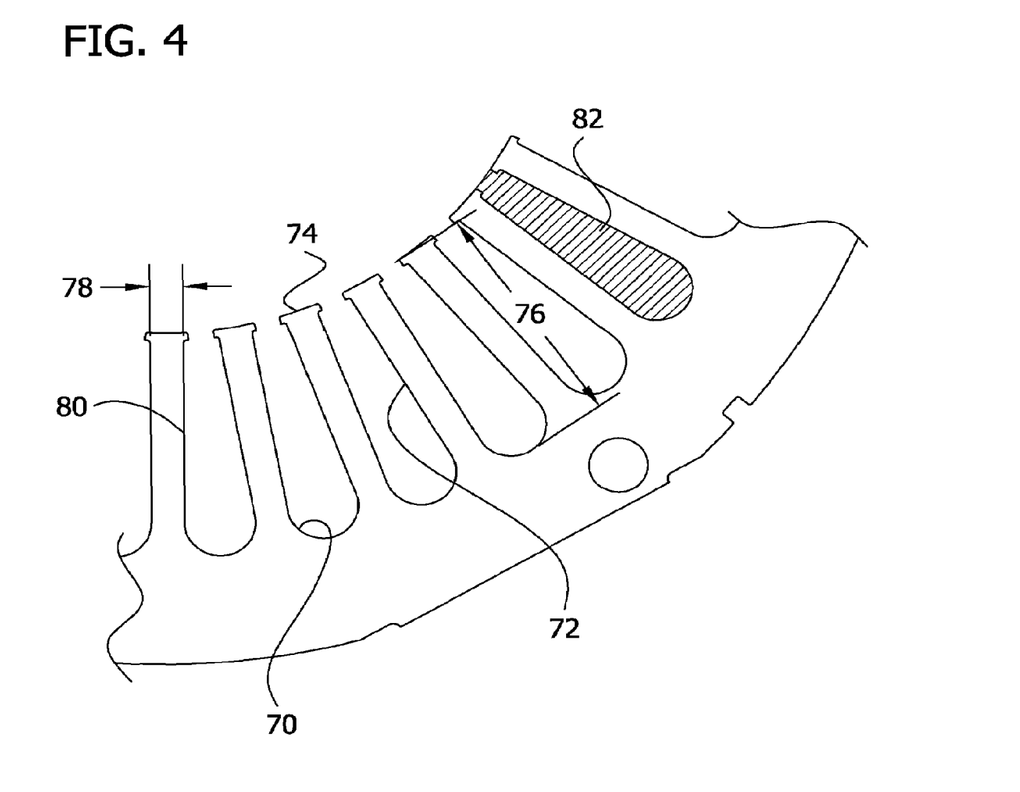
FIG. 4 is an enlarged end elevation of the stator lamination of the electric machine.

As illustrated in FIG. 2, the stator assembly 30 includes a laminated body or core, generally designated by 40, comprising stacked lamina or laminations 42. A lamination 42 is shown in FIGS. 3 and 4. Although the laminations 42 may be made of other materials without departing from the scope of the present invention, in one embodiment the laminations are made from electrical grade steel alloy sheet or plate stock having a thickness in a range from about 0.014 inch to about 0.032 inch. The stator core 40 of this embodiment has a total thickness in a range from about 0.75 inch to about 4 inches. As will be appreciated by those skilled in the art, different types of materials and materials having different thicknesses may be used depending upon motor design and performance requirements without departing from the scope of the present invention. As will be appreciated by those skilled in the art, the lamina may be formed in sectors and stacked in a staggered configuration without departing from the scope of the present invention.

The stator core 40 has an annular rim 50 and a plurality of teeth 52 extending radially inward from the rim. Although the stator core 40 may have other numbers of teeth 52 without departing from the scope of the present invention, in one embodiment the stator core has 36 teeth. As will be readily understood by one skilled in the art, a winding 54 is wrapped around sets of teeth 52 such as sets of two, three, four, or more teeth. This type of winding is conventionally known as concentric winding. Other winding schemes and techniques may also be used without departing from the scope of embodiments of the present invention. For example, the stator assembly 30 may be series wound, parallel wound and multiple path parallel wound, as will be understood by those skilled in the art. In one embodiment, the windings 54 are each made from a single strand of aluminum wire wound around sets of teeth a plurality of times. Although wires having other characteristics may be used without departing from the scope of the present invention, in one embodiment the wires are 20 American Wire Gauge (AWG), insulated, single strand, aluminum wire. In other embodiments, the wire may be all copper or a combination of aluminum and copper, such as copper clad aluminum. Other wire sizes from about 26 AWG to about 14 AWG for all aluminum wire and from about 30 AWG to about 14 AWG for all copper wire are also contemplated as being within the scope of some embodiments of the present invention. Although the wires may have other cross-sectional shapes without departing from the scope of the present invention, in one embodiment the wire has a round, and more particularly a circular, cross section. Depending upon the solidity factor required to obtain suitable slot density, other cross-sectional shapes may be used. Electric current flows through the windings 54 generating a rotating magnetic field that interacts with the currents induced in the induction rotor bars 34 to drive the rotor assembly 26 to rotate relative to the stator assembly 30. As will be appreciated by those skilled in the art, the stator core 40 has four, six or eight magnetic dipoles. In other words, the stator assembly 30 has windings 54 that are electrically energized to provide four, six or eight magnetic dipoles that rotate around the stator core 40.

As shown in FIGS. 3 and 4, the stator core 40 (and each of the laminations 42 forming the stator core) has an outer diameter 60, a root tooth diameter 62, and an inner diameter 64. Although the stator core 40 may have other dimensions without departing from the scope of the present invention, in some embodiments the stator core has an outer diameter 60 in a range from about 5.1 inches to about 5.9 inches. In some further embodiments, the stator core 40 has an outer diameter 60 in a range from about 5.3 inches to about 5.7 inches, and in some still further embodiments the stator core has an outer diameter of less than about 5.5 inches. In some particular embodiments, the stator core 40 has an outer diameter 60 of about 5.49 inches. Moreover, in some embodiments the stator core 40 has a root tooth diameter 62 in a range from about 4.6 inches to about 4.7 inches, and in some still further embodiments the stator core has a root tooth diameter of about 4.64 inches. Further, in some embodiments the stator core 40 has an inner diameter 64 of less than bout 3.0 inches. In some further embodiments, the stator core 40 has an inner diameter 64 of about 2.9 inches, and in some still further embodiments the stator core has an inner diameter of about 2.84 inches. In some embodiments, the stator core 40 has a ratio of the stator core inner diameter 64 to the stator core outer diameter 60 is less than about 0.55. This ratio of less than about 0.55 allows for a lower conductivity material, such as aluminum, to be used while maintaining performance as compared with a higher conductivity material, such as copper. Specifically, this ratio provides additional stator area for adding additional wire to the winding 54 within the stator core 40, as compared with a conventional stator core designed with a ratio of about 0.55 or more. In some further embodiments, the ratio of the stator core inner diameter 64 to the stator core outer diameter 60 is less than about 0.53, and in some still further embodiments the ratio stator core inner diameter 64 to the stator core outer diameter 60 is about 0.517. The foregoing ratios also allow for use of a lower conductivity material while maintaining performance, as discussed above.

In addition, each tooth 52 has a root 70, a neck 72 extending inward from the root, a head 74 opposite the root, and a length 76 (or tooth length), measured from the root to the head. Each neck 72 has a width 78 (or tooth width) and each adjacent pair of teeth 52 define a slot 80 having an area 82. Although the teeth 52 may have other dimensions without departing from the scope of the present invention, in some embodiments each tooth has a length 76 in a range from about 0.82 inch to about 0.98 inch. In some further embodiments, each tooth 52 has a length 76 in a range from about 0.87 inch to about 0.93 inch, and in some particular embodiments, each tooth has a length of about 0.90 inch. In some embodiments each tooth neck 72 has a width 78 in a range from about 0.110 inch to about 0.134 inch. In some further embodiments, each tooth neck 72 has a width 78 in a range from about 0.118 inch to about 0.126 inch, and in some particular embodiments, each tooth neck has a width of about 0.122 inch. Although the teeth 52 may have other dimensions without departing from the scope of the present invention, in some embodiments each tooth has a ratio of the tooth neck width 78 to the tooth length 76 of less than about 0.149. This ratio of less than about 0.149 allows for a lower conductivity material, such as aluminum, to be used while maintaining performance as compared with a higher conductivity material, such as copper. Specifically, this ratio provides teeth having an elongate aspect ratio, thereby providing additional space between teeth and along the length of the teeth for adding additional wire to the winding 54 within the stator core 40, as compared with a conventional stator core designed with a ratio of about 0.149 or more. In some further embodiments, each tooth 52 has a ratio of the tooth neck width 78 to the tooth length 76 of less than about 0.140, and in some particular embodiments each tooth has a ratio of the tooth neck width to the tooth length is less than about 0.136. The foregoing ratios also allow for use of a lower conductivity material while maintaining performance, as discussed above.

Although the stator core 40 may have other dimensions without departing from the scope of the present invention, in some embodiments the stator core has an outer diameter 60 in a range from about 5.1 inches to about 5.9 inches and slots 80 have a total combined area 82 in a range from about 5.3 square inches to about 7.1 square inches. This range from about 5.3 square inches to about 7.1 square inches allows for a lower conductivity material, such as aluminum, to be used while maintaining performance as compared with a higher conductivity material, such as copper. Specifically, this range provides more slot space for adding additional wire to the winding 54 within the stator core 40, as compared with a conventional stator core designed outside the about 5.3 square inches to about 7.1 square inches range. In some further embodiments, the slots 80 have a total combined area 82 of about 6.176 square inches. The foregoing area also allows for use of a lower conductivity material while maintaining performance, as discussed above.

Moreover, in some embodiments a ratio of a sum of the slot areas to the enclosed cross-sectional area of the motor 20 is in a range from about 0.24 to about 0.27. This ratio range from about 0.24 to about 0.27 allows for a lower conductivity material, such as aluminum, to be used while maintaining performance as compared with a higher conductivity material, such as copper. Specifically, this ratio range provides more slot area as a portion of motor size for adding additional wire to the winding 54 within the stator core 40, as compared with a conventional stator core designed with a ratio outside the about 0.24 to about 0.27 range. In some further embodiments, the ratio of the sum of the slot areas to the enclosed cross-sectional area is greater than about 0.26, and in some particular embodiments the ratio is about 0.261. The foregoing ratios also allow for use of a lower conductivity material while maintaining performance, as discussed above.

Exemplary slot and pole combinations defined by the stator core 40 include 24 slots 80 and 4, 6 or 8 poles, 36 slots and 4, 6 or 8 poles, and 40 slots and 4, 6 or 8 poles.

As other features of the apparatus 10 and motor 20 are generally understood by those of ordinary skill in the art, the conventional aspects of these devices will not be described in further detail.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A stator assembly adapted for use in an electric motor, said assembly comprising:
    a stator core having an annular rim, a plurality of teeth extending radially inward from the rim, an outer diameter, a root tooth diameter and an inner diameter, each tooth of said plurality of teeth having a root, a neck extending inward from the root, a head opposite the root, and a length measured from its root to its head, said neck having a width, each adjacent pair of teeth of said plurality of teeth defining a slot having an area; and
    a winding comprising at least one of aluminum and copper wrapped around at least three teeth of said plurality of teeth of the stator core;
    wherein the stator core and winding have four, six or eight magnetic dipoles;
    wherein the stator core outer diameter is in a range from about 5.1 inches to about 5.9 inches; and
    wherein the stator core inner diameter is less than about 3.0 inches.

2. A stator assembly as set forth in claim 1 wherein the stator core outer diameter is in a range from about 5.3 inches to about 5.7 inches.

3. A stator assembly as set forth in claim 2 wherein the stator core outer diameter is about 5.49 inches.

4. A stator assembly as set forth in claim 1 wherein the stator core inner diameter is less than about 2.9 inches.

5. A stator assembly as set forth in claim 4 wherein the stator core inner diameter is about 2.84 inches.

6. A stator assembly as set forth in claim 1 wherein a ratio of the stator core inner diameter to the stator core outer diameter is less than about 0.55.

7. A stator assembly as set forth in claim 6 wherein a ratio of the stator core inner diameter to the stator core outer diameter is less than about 0.53.

8. A stator assembly as set forth in claim 7 wherein a ratio of the stator core inner diameter to the stator core outer diameter is about 0.517.

9. A stator assembly as set forth in claim 1 wherein a ratio of the tooth width to the tooth length is less than about 0.149.

10. A stator assembly as set forth in claim 9 wherein a ratio of the tooth width to the tooth length is less than about 0.140.

11. A stator assembly as set forth in claim 10 wherein a ratio of the tooth width to the tooth length is less than about 0.136.

12. A stator assembly as set forth in claim 1 wherein a ratio of a sum of the slot areas to the enclosed cross-sectional area is in a range from about 0.24 to about 0.27.

13. A stator assembly as set forth in claim 12 wherein a ratio of a sum of the slot areas to the enclosed cross-sectional area is greater than about 0.26.

14. A stator assembly as set forth in claim 1 wherein the winding comprises copper clad aluminum.

15. A stator assembly adapted for use in an electric motor, said assembly comprising:
a stator core having an annular rim, a plurality of teeth extending radially inward from the rim, an outer diameter, a root tooth diameter and an inner diameter, each tooth of said plurality of teeth having a root, a neck extending inward from the root, and a head opposite the root, each adjacent pair of teeth of said plurality of teeth defining a slot; and
a winding comprising at least one of aluminum and copper wrapped around at least three teeth of said plurality of teeth of the stator core;
wherein the stator core and winding have four, six or eight magnetic dipoles;
wherein the stator core outer diameter is in a range from about 5.3 inches to about 5.7 inches; and
wherein a ratio of the stator core inner diameter to the stator core outer diameter is less than about 0.55.

16. A stator assembly as set forth in claim 15 wherein the stator core outer diameter is about 5.49 inches.

17. A stator assembly as set forth in claim 15 wherein the stator core inner diameter is less than about 3.0 inches.

18. A stator assembly as set forth in claim 17 wherein the stator core inner diameter is about 2.84 inches.

19. A stator assembly as set forth in claim 15 wherein a ratio of the stator core inner diameter to the stator core outer diameter is less than about 0.53.

20. A stator assembly as set forth in claim 19 wherein a ratio of the stator core inner diameter to the stator core outer diameter is about 0.517.

21. A stator assembly as set forth in claim 15 wherein a ratio of the tooth width to the tooth length is less than about 0.14.

22. A stator assembly as set forth in claim 15 wherein a ratio of a sum of the slot areas to the enclosed cross-sectional area is greater than about 0.26.

23. A stator assembly as set forth in claim 15 wherein the winding comprises copper clad aluminum.

24. A stator assembly adapted for use in an electric motor, said assembly comprising:
a stator core having an annular rim, a plurality of teeth extending radially inward from the rim, an outer diameter, a root tooth diameter and an inner diameter, each tooth of said plurality of teeth having a root, a neck extending inward from the root, a head opposite the root, and a length measured from its root to its head, said neck having a width, each adjacent pair of teeth of said plurality of teeth defining a slot; and
a winding comprising at least one of aluminum and copper wrapped around at least three teeth of said plurality of teeth of the stator core;
wherein the stator core and winding have four, six or eight magnetic dipoles;
wherein the stator core outer diameter is in a range from about 5.1 inches to about 5.9 inches; and
wherein a ratio of the tooth width to the tooth length is less than about 0.14.

25. A stator assembly as set forth in claim 24 wherein the ratio of the tooth width to the tooth length is less than about 0.136.

26. A stator assembly as set forth in claim 24 wherein the stator core outer diameter is in a range from about 5.3 inches to about 5.7 inches.

27. A stator assembly as set forth in claim 26 wherein the stator core outer diameter is about 5.49 inches.

28. A stator assembly as set forth in claim 24 wherein the stator core inner diameter is less than about 3.0 inches.

29. A stator assembly as set forth in claim 28 wherein the stator core inner diameter is about 2.84 inches.

30. A stator assembly as set forth in claim 24 wherein a ratio of the stator core inner diameter to the stator core outer diameter is less than about 0.55.

31. A stator assembly as set forth in claim 30 wherein a ratio of the stator core inner diameter to the stator core outer diameter is less than about 0.53.

32. A stator assembly as set forth in claim 31 wherein a ratio of the stator core inner diameter to the stator core outer diameter is about 0.517.

33. A stator assembly as set forth in claim 24 wherein a ratio of a sum of the slot areas to the enclosed cross-sectional area is greater than about 0.26.

34. A stator assembly as set forth in claim 24 wherein the winding comprises copper clad aluminum.

35. A stator assembly adapted for use in an electric motor, said assembly comprising:
a stator core having an annular rim, a plurality of teeth extending radially inward from the rim, an outer diameter, a root tooth diameter and an inner diameter, each tooth of said plurality of teeth having a root, a neck extending inward from the root, and a head opposite the root, said annular rim having an outer edge defining an enclosed cross-sectional area, each adjacent pair of teeth of said plurality of teeth defining a slot having an area; and
a winding comprising at least one of aluminum and copper wrapped around at least three teeth of said plurality of teeth of the stator core;
wherein the stator core and winding have four, six or eight magnetic dipoles;
wherein the stator core outer diameter is in a range from about 5.1 inches to about 5.9 inches; and
wherein a ratio of a sum of the slot areas to the enclosed cross-sectional area is in a range from about 0.24 to about 0.27.

36. A stator assembly as set forth in claim 35 wherein the stator core outer diameter is in a range from about 5.3 inches to about 5.7 inches.

37. A stator assembly as set forth in claim 36 wherein:
the stator core outer diameter is about 5.49 inches; and
the ratio of the sum of the slot areas to the enclosed cross-sectional area is about 0.26.

38. A stator assembly as set forth in claim 35 wherein the stator core inner diameter is less than about 3.0 inches.

39. A stator assembly as set forth in claim 38 wherein the stator core inner diameter is about 2.84 inches.

40. A stator assembly as set forth in claim 35 wherein a ratio of the stator core inner diameter to the stator core outer diameter is less than about 0.55.

41. A stator assembly as set forth in claim 40 wherein a ratio of the stator core inner diameter to the stator core outer diameter is less than about 0.53.

42. A stator assembly as set forth in claim 41 wherein a ratio of the stator core inner diameter to the stator core outer diameter is about 0.517.

43. A stator assembly as set forth in claim 35 wherein a ratio of the tooth width to the tooth length is less than about 0.14.

44. A stator assembly as set forth in claim 35 wherein the winding comprises copper clad aluminum.

45. A stator assembly adapted for use in an electric motor, said assembly comprising:

a stator core having an annular rim, 36 teeth extending radially inward from the rim, an outer diameter, a root tooth diameter and an inner diameter, each tooth of the 36 teeth having a root, a neck extending inward from the root, and a head opposite the root, said annular rim having an outer edge defining an enclosed cross-sectional area, each adjacent pair of teeth of the 36 teeth defining a slot having an area; and a winding comprising at least one of aluminum and copper wrapped around at least three teeth of said plurality of teeth of the stator core;

wherein the stator core and winding have four, six or eight magnetic dipoles; and wherein a ratio of a sum of the slot areas to the enclosed cross-sectional area is about 0.26.

46. An electric machine comprising:

a stator core having an annular rim, a plurality of teeth extending radially inward from the rim, an outer diameter, a root tooth diameter and an inner diameter, each tooth of said plurality of teeth having a root, a neck extending inward from the root, a head opposite the root, and a length measured from its root to its head, said neck having a width, each adjacent pair of teeth of said plurality of teeth defining a slot having an area; and a winding comprising at least one of aluminum and copper wrapped around at least three teeth of said plurality of teeth of the stator core; and a rotor body rotatably mounted inside the stator core including an external surface facing said stator core; and wherein the stator core and winding have four, six or eight magnetic dipoles;

wherein the stator core outer diameter is greater than about 5.1 inches; and wherein the stator core inner diameter is less than about 3.0 inches.

47. An electric machine as set forth in claim 46 wherein the machine comprises a motor having a continuous duty shaft output power of less than about 1 kilowatt.

48. An electric machine as set forth in claim 47 wherein the machine comprises a motor having a continuous duty shaft output power of less than about 700 watts.

49. An electric machine comprising:

a stator core having an annular rim, a plurality of teeth extending radially inward from the rim, an outer diameter, a root tooth diameter and an inner diameter, each tooth of said plurality of teeth having a root, a neck extending inward from the root, and a head opposite the root, each adjacent pair of teeth of said plurality of teeth defining a slot;

a winding comprising at least one of aluminum and copper wrapped around at least three teeth of said plurality of teeth of the stator core; and a rotor body rotatably mounted inside the stator core including an external surface facing said stator core;

wherein the stator core and winding have four, six or eight magnetic dipoles;

wherein the stator core outer diameter is in a range from about 5.3 inches to about 5.7 inches; and wherein a ratio of the stator core inner diameter to the stator core outer diameter is less than about 0.55.

50. An electric machine as set forth in claim 49 wherein the machine comprises a motor having a continuous duty shaft output power of less than about 1 kilowatt.

51. An electric machine as set forth in claim 50 wherein the machine comprises a motor having a continuous duty shaft output power of less than about 700 watts.

52. An electric machine comprising:

a stator core having an annular rim, a plurality of teeth extending radially inward from the rim, an outer diameter, a root tooth diameter and an inner diameter, each tooth of said plurality of teeth having a root, a neck extending inward from the root, a head opposite the root, and a length measured from its root to its head, said neck having a width, each adjacent pair of teeth of said plurality of teeth defining a slot;

a winding comprising at least one of aluminum and copper wrapped around at least three teeth of said plurality of teeth of the stator core; and a rotor body rotatably mounted inside the stator core including an external surface facing said stator core;

wherein the stator core and winding have four, six or eight magnetic dipoles;

wherein the stator core outer diameter is in a range from about 5.1 inches to about 5.9 inches; and wherein a ratio of the tooth width to the tooth length is less than about 0.14.

53. An electric machine comprising:

a stator core having an annular rim, a plurality of teeth extending radially inward from the rim, an outer diameter, a root tooth diameter and an inner diameter, each tooth of said plurality of teeth having a root, a neck extending inward from the root, and a head opposite the root, said annular rim having an outer edge defining an enclosed cross-sectional area, each adjacent pair of teeth of said plurality of teeth defining a slot having an area;

a winding comprising at least one of aluminum and copper wrapped around at least three teeth of said plurality of teeth of the stator core; and a rotor body rotatably mounted inside the stator core including an external surface facing said stator core; and wherein the stator core and winding have four, six or eight magnetic dipoles;

wherein the stator core outer diameter is in a range from about 5.1 inches to about 5.9 inches; and wherein a ratio of a sum of the slot areas to the enclosed cross-sectional area is greater than about 0.26.

* * * * *